No. 613,741. Patented Nov. 8, 1898.
C. W. VAUGHN.
SEWER PIPE DELIVERING AND INVERTING APPARATUS.
(Application filed Dec. 22, 1897.)
(No Model.) 4 Sheets—Sheet 1.

Witnesses:
H. H. Bartges
T. H. Phelps

Inventor:
Calvin W. Vaughn,
by Humphrey & Humphrey
Attys.

No. 613,741. Patented Nov. 8, 1898.
C. W. VAUGHN.
SEWER PIPE DELIVERING AND INVERTING APPARATUS.
(Application filed Dec. 22, 1897.)
(No Model.) 4 Sheets—Sheet 2.
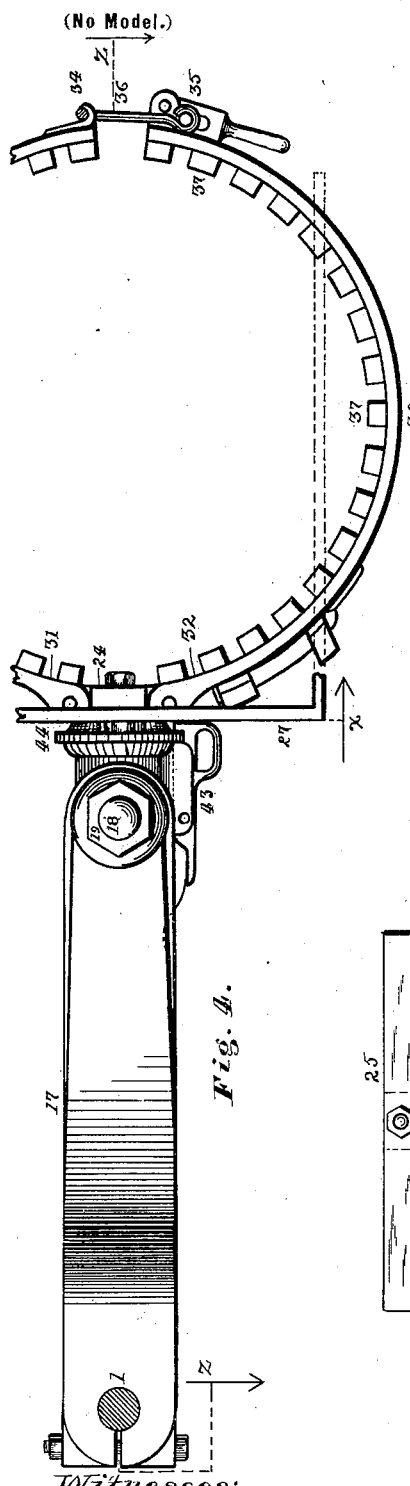
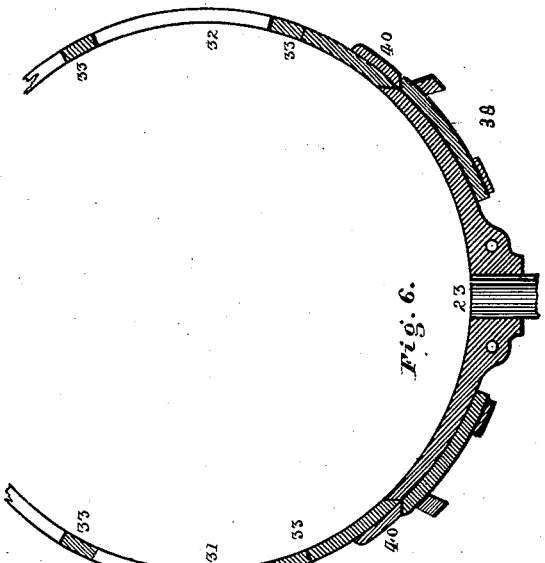
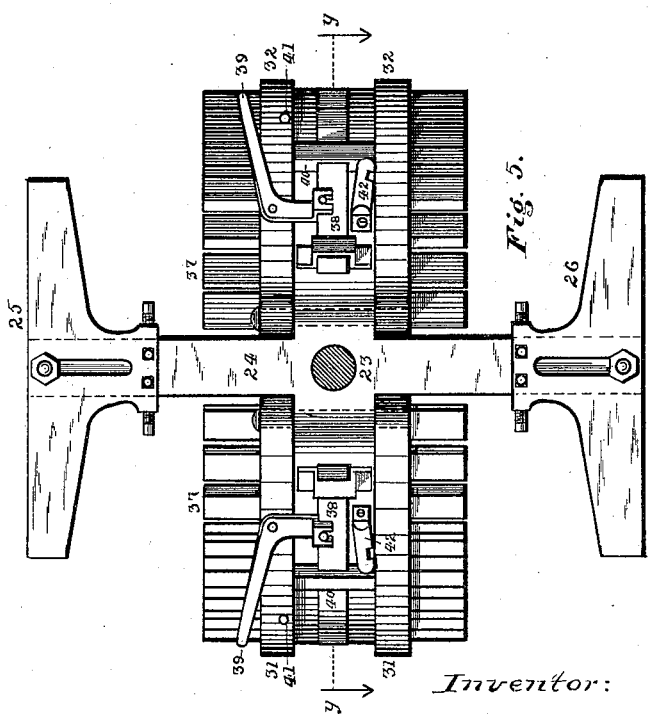
Inventor:
Calvin W. Vaughn,
by Humphrey & Humphrey
Attys.
Witnesses:

No. 613,741. Patented Nov. 8, 1898.
C. W. VAUGHN.
SEWER PIPE DELIVERING AND INVERTING APPARATUS.
(Application filed Dec. 22, 1897.)
(No Model.) 4 Sheets—Sheet 3.
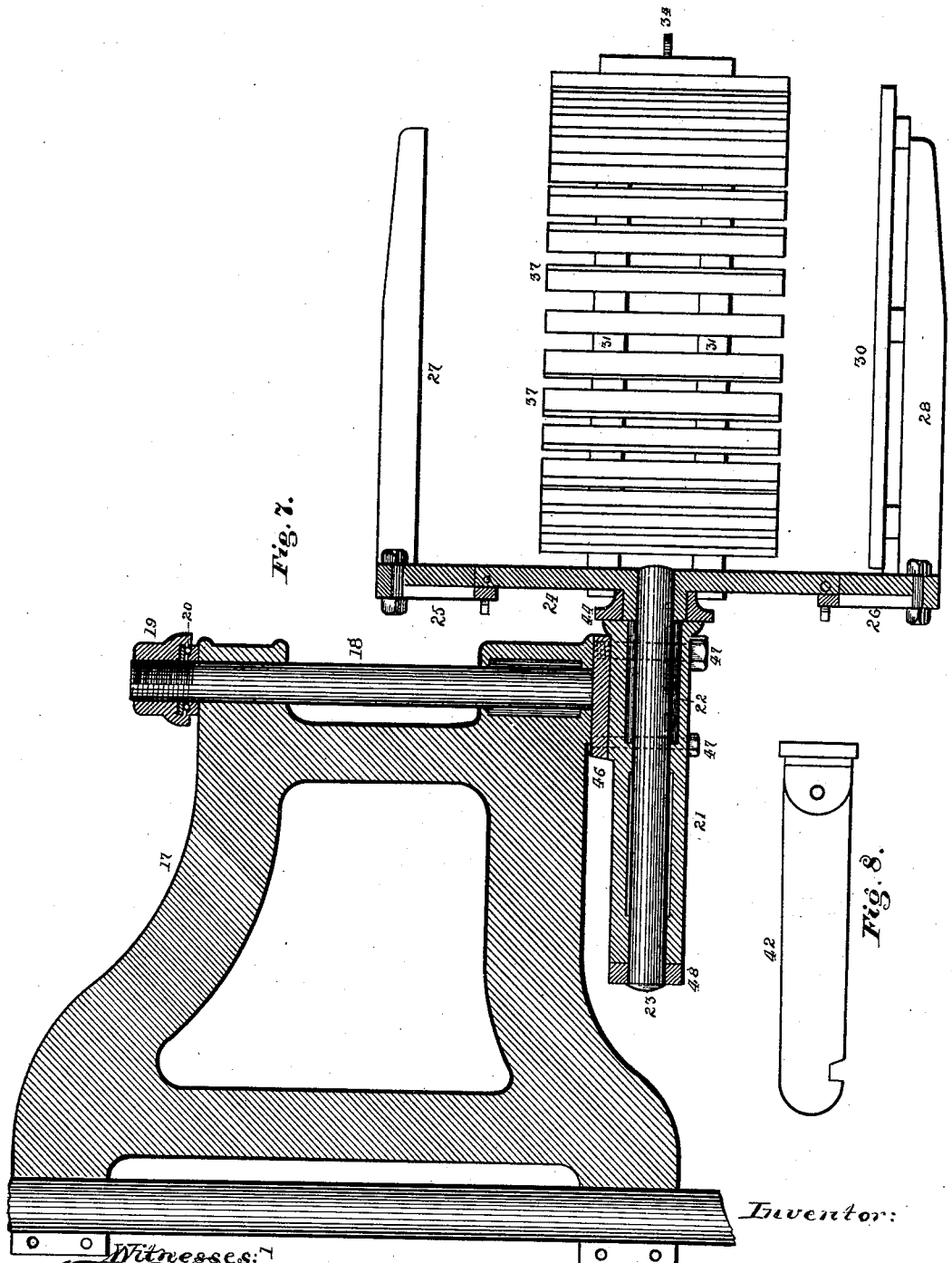

No. 613,741. Patented Nov. 8, 1898.
C. W. VAUGHN.
SEWER PIPE DELIVERING AND INVERTING APPARATUS.
(Application filed Dec. 22, 1897.)

(No Model.) 4 Sheets—Sheet 4.

Witnesses:

Inventor:
Calvin W. Vaughn,
By Humphrey & Humphrey,
Attys

UNITED STATES PATENT OFFICE.

CALVIN W. VAUGHN, OF CUYAHOGA FALLS, OHIO.

SEWER-PIPE DELIVERING AND INVERTING APPARATUS.

SPECIFICATION forming part of Letters Patent No. 613,741, dated November 8, 1898.

Application filed December 22, 1897. Serial No. 663,084. (No model.)

*To all whom it may concern:*

Be it known that I, CALVIN W. VAUGHN, a citizen of the United States, residing at Cuyahoga Falls, in the county of Summit and State of Ohio, have invented a certain new and useful Improvement in Sewer-Pipe Delivering and Inverting Apparatus, of which the following is a specification.

My invention has relation to improvements in devices for removing sections of green sewer-pipe from the press after they have been severed from the mass of clay in the press and for inverting them so that the socket which is first made shall be at the top. With pipes of moderate size this is accomplished by hand, the smaller by one person and the larger by two, but as the pipe increases in size the difficulty of this operation increases, at first resulting in danger of injury to the pipe in its plastic state, and finally, by reason of the great weight, becoming practically impossible.

The object of my invention is to accomplish this operation mechanically by means of mechanism that shall receive the pipe of any size, remove the sections from the press, invert them, and deliver them upon a proper vehicle for their removal to their place in the drying-room, and during the time of its engagement with each section shall firmly and evenly grasp the section of pipe, so as to prevent any distortion or injury to it.

To the aforesaid object my invention consists in the peculiar and novel construction, arrangement, and combination of parts hereinafter described, and then specifically pointed out in the claims, reference being had to the accompanying drawings, which form a part of this specification.

Figures 1, 2, 3:
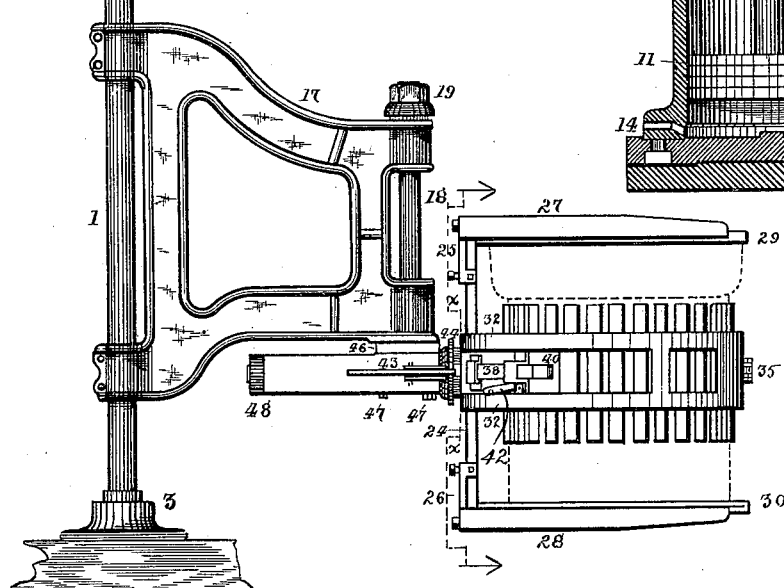
Figure 9:
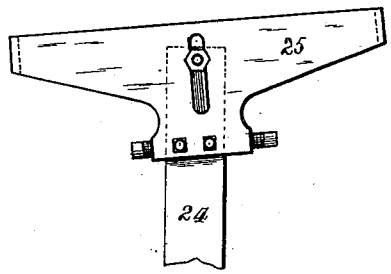
Figure 10:
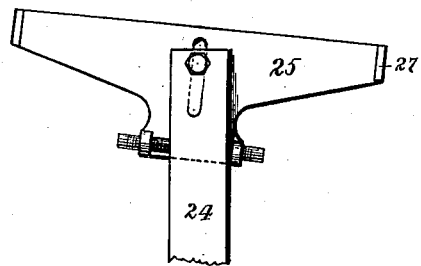
Figure 11:
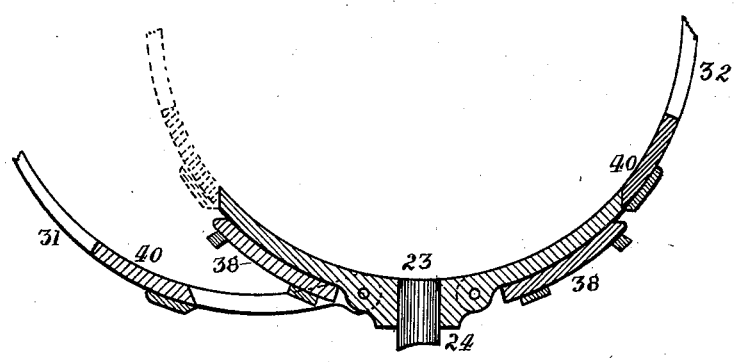

In the accompanying drawings, in which similar reference-numerals indicate like parts in the different figures, Figure 1 is a side elevation of my improved apparatus; Fig. 2, a central vertical section, enlarged, of the lifting-cylinder and piston hereinafter described; Fig. 3, a central vertical section of the bearing and step of the supporting-shaft; Fig. 4, a plan, enlarged, of swinging bracket and slatted curved arms for inclosing the pipe and connected parts; Fig. 5, an elevation of the same, looking from left at the line $x\,x$ of Figs. 1 and 4; Fig. 6, a section of Fig. 5 at the line $y\,y$; Fig. 7, a central vertical section of Fig. 4 at the line $z\,z$; Fig. 8, an enlarged view of one of the hooks for holding the arm carrying the slats. Figs. 9 and 10 are enlarged details of the pipe-carrying arms and brackets; Fig. 11, a section of Fig. 5 at the line $y\,y$, illustrating operation of locking-latch.

Referring to the figures, 1 is a round vertical hollow shaft revolubly mounted in bearings 2 3, supported on suitable framework and having in the bottom a concave bearing 4, which rests on a convex base 5. The bottom of the base has an annular channel in which is fitted a hardened-steel ring 6, slightly above and coincident with a similar ring 7, which fits an annular seat in a circular head 8 on the piston-rod 9, and between the rings 6 and 7 are hard-steel balls 10. By this arrangement the friction with the shaft is reduced to a minimum, while the concave bearing 4 prevents any binding at that point from any deviation in alinement of the parts. The piston-rod 9 bears a single-acting piston 11 in the cylinder 12, which is supported on a suitable foundation 13 and is provided with inlet and exhaust ports 14 15 and a constantly-open vent 16.

This device permits the shaft and its connected parts to be raised and lowered the desired distance to accommodate it to its work.

Rigidly attached to the shaft 1 is a bracket 17, having at its outer end bearings in which is journaled a vertical shaft 18. The shaft 18 is supported and retained by a nut 19, provided with ball-bearings 20, and bears at its lower end a horizontal plate 46, integral with shaft 18 and to which is secured by bolts 47 an elongated box 21, having roller-bearings 22, in which runs a horizontal shaft 23. The outer end of the shaft 23 bears a cruciform head 24, to the upper and lower arms of which are adjustably fastened brackets 25 26, bearing horizontal arms 27 28, for carrying a "bat-board" 29 and a follow-board 30, respectively. The brackets 25 and 26 are retained in position by bolts passing through the head 24 and slots in the brackets, thus permitting radial adjustment, and in the lower part of the brackets are set-screws for further adjustment, using the bolts for centers, as shown in Figs. 9 and 10.

In each horizontal arm of the cruciform head 24 is hinged a pair of curved bars 31 32, united at intervals and at their free ends by cross-bars 33, and on one of which is a hook 34 and on one of the cross-bars of the other pair a pivoted handle 35, on which is pivotally connected a link 36, eccentric to the handle-pivot, so that by hooking the link 36 into the hook 34 and swinging the handle 35 back the two pairs of curved bars 31 32 will be locked together at their free ends. On the inside of each pair of curved bars 31 32 are fastened at near intervals vertical slats 37 of wood to engage and retain the section of pipe.

On each horizontal arm of the cruciform head 24 is a sliding latch 38, operated by a bent lever 39, which latch rests against a cross-bar 40, attached to the curved bars 31 32, by which arrangement the pairs of curved bars are locked tight, (see Figs. 5, 6, and 11,) and the downward movement of the levers 39 is limited by pins 41. Below the latches 38 are pivotally connected hooks 42, that project radially outward from the horizontal arms of the cruciform head 24 and serve to retain the curved bars 31 32 when swung outward until it is desired to return them, and thus prevent them from swinging inward to the interruption of the other parts of the mechanism.

The shaft 23, with the cruciform head and connected parts, is retained against revolution until desired by a latch 43 on the elongated box 21, that engages a notch in the flanged collar 44 on the hub of the cruciform head. The shaft 23 is retained in place by a collar 48.

In operation the apparatus is so prepared and located that the horizontal arms 28 when swung inward will pass under the edges of the follow-board 30 and the curved bars 31 32, with their slats, will encircle, when closed, the pipe as it stands when issued from the press, and these curved bars 31 32 are swung outward and held by the hooks 42. The pipe with the socket downward, as before stated, is severed from the clay in the press and lowered slightly from the press. The curved bars 31 32 are then released from the hooks 42 and swung together about the crock and held by means of the levers 39 and latches 38 and further locked by the locking-link 36, before mentioned, and the bottom board 30 is placed on top of the pipe under the arms 28, Fig. 1 showing the pipe after being inverted and ready for delivery. Steam is then admitted to the cylinder 12 and the shaft 1, bracket 17, and connected parts raised enough to support the pipe freely. The bracket 17 is then swung around to one side to clear the press, the latch 43 released, and the shaft 23, with its connected parts, revolved half around, thus inverting the pipe. A car or truck is then passed under the bottom board 30, and, by means of the cylinder 12, the shaft 1, and bracket 17, lowered until the bottom board 30 rests on it or any arrangement for delivery. The parts are then released and returned to repeat the operation.

I do not confine myself to a steam-cylinder for raising shaft 1; but other means, as a rack and pinion or hydraulic cylinder, may be used.

Having thus described my invention, what I claim, and wish to secure by Letters Patent, is—

1. In a machine for inverting sections of sewer-pipe, the combination of a vertically-adjustable shaft, a swing-bracket on said shaft, and a horizontally-revoluble pipe-carrying head, substantially as shown and described.

2. In a machine for inverting sections of sewer-pipe, the combination of a revoluble vertical shaft, a bracket adjustably mounted thereon; a vertical shaft journaled in said bracket; a horizontal journal-bearing hung on said shaft, a shaft journaled in said bearing; a cruciform head mounted on said last-named shaft; horizontal arms to extend above and below the pipe-sections adjustably secured to vertical arms of said head; curved bars hinged to said head; slats attached to said bars to inclose said pipe, and a locking device to retain the free ends of said arms together; all constructed and arranged substantially as shown and described.

3. In a machine for inverting sections of sewer-pipe, the combination of a revoluble vertical shaft; a bracket mounted thereon; and mechanism for grasping and holding sewer-pipe while being inverted; with a cylinder, piston and rod arranged in alinement below said shaft and adapted to raise and lower the same, substantially as shown and described.

4. In a machine for inverting sections of sewer-pipe, the combination of a vertical shaft, a bracket mounted thereon; devices on said bracket for grasping the pipe, a cylinder, piston and rod arranged in alinement below said shaft, with a ball-bearing, and ball-and-socket joint between said shaft and piston-rod to permit the free motion of said shaft; substantially as shown and described.

5. In a machine for inverting sections of sewer-pipe, the combination of a vertical shaft; a bracket mounted thereon; a vertical counter-shaft; a horizontal journal-bearing supported on said counter-shaft; a shaft mounted therein carrying pipe-holding mechanism with a locking device to arrest said horizontal shaft against revolution, substantially as shown and described.

6. In a machine of the class designated, the combination of a vertical shaft, a bracket carried thereby, a parallel counter-shaft, a journal hung on said last-named shaft, a shaft mounted in said journal, and a pipe-carrying head mounted on said shaft, substantially as shown and described.

7. In a machine of the class designated, the combination of a vertically-movable shaft, a bracket carried thereby, a journal revolubly mounted in said bracket, a horizontal shaft mounted in said journal, a cruciform head on said shaft, adjustable yokes mounted on two of its said arms; horizontally-swinging, inclosing, semicircular bars hinged in the other arms thereof, and latches on said arms adapted to lock said bars and arms together, substantially as shown and described.

8. In a machine of the class designated the combination of two sets of parallel arms adapted to hold pipe-boards placed at both ends of a section of pipe, a pair of semicircular inclosing arms; vertical slats lining the inner sides thereof and arranged to inclose the exterior of said pipe in its cylindrical part, with suitable mechanism permitting horizontal rotation of said inclosing device substantially as shown and described.

In testimony that I claim the above I hereunto set my hand.

CALVIN W. VAUGHN.

In presence of—
C. E. HUMPHREY,
C. P. HUMPHREY.